Fig. 1

Jan. 19, 1943.  R. ANSCHÜTZ  2,308,906
TYPEWRITING-CALCULATING MACHINE WITH SEVERAL CROSS TOTALIZERS
Filed Nov. 21, 1938  8 Sheets-Sheet 3

R. Anschütz
Inventor

By: Glascock Downing & Seebold
Attys.

Jan. 19, 1943.   R. ANSCHÜTZ   2,308,906
TYPEWRITING-CALCULATING MACHINE WITH SEVERAL CROSS TOTALIZERS
Filed Nov. 21, 1938   8 Sheets-Sheet 5

R. Anschütz
Inventor

By: Glascock Downing & Seebold
Attys.

Jan. 19, 1943.  R. ANSCHÜTZ  2,308,906
TYPEWRITING-CALCULATING MACHINE WITH SEVERAL CROSS TOTALIZERS
Filed Nov. 21, 1938  8 Sheets-Sheet 6

R. Anschütz
Inventor

By: 
Attys.

Jan. 19, 1943.                R. ANSCHÜTZ                         2,308,906
            TYPEWRITING-CALCULATING MACHINE WITH SEVERAL CROSS TOTALIZERS
                  Filed Nov. 21, 1938            8 Sheets-Sheet 8

R. Anschütz
Inventor

By Glascock Downing & Seebold
Attys.

Patented Jan. 19, 1943

2,308,906

UNITED STATES PATENT OFFICE 2,308,906

TYPEWRITING-CALCULATING MACHINE WITH SEVERAL CROSS TOTALIZERS

Robert Anschütz, Zella-Mehlis, Germany; vested in the Alien Property Custodian

Application November 21, 1938, Serial No. 241,673
In Germany November 24, 1937

1 Claim. (Cl. 235—59)

This invention relates to a typewriting-calculating machine with several cross totalizers, in which machine a driving or master wheel is provided for each cross totalizer, and the driving wheels are arranged to be selectively coupled with a change-over or state control gear controlling the direction of rotary movement of all driving wheels.

In the known devices of this kind, difficulties occurred when more than two cross totalizers were provided, because extra mechanisms were necessary for the control of the coupling members. This involves larger size of the machine and a substantial increase in the cost of manufacturing and assembling.

According to the invention, an improvement of this known device is effected by providing a separate coupling member for connecting each driving wheel to the change-over or state control gear, and by arranging each coupling member to be operated independently by a controlling member common to all coupling members.

By these means, it is possible to connect each cross totalizer to the drive independently, and a much wider range of operation is obtained than in the known devices in which only one coupling member was provided for all totalizers. Moreover, this is achieved by the provision of a comparatively simple controlling mechanism, even if more than two cross totalizers are provided.

In the drawings, a constructional example of the subject matter of the invention is illustrated.

Description of the individual parts

Figure 1:
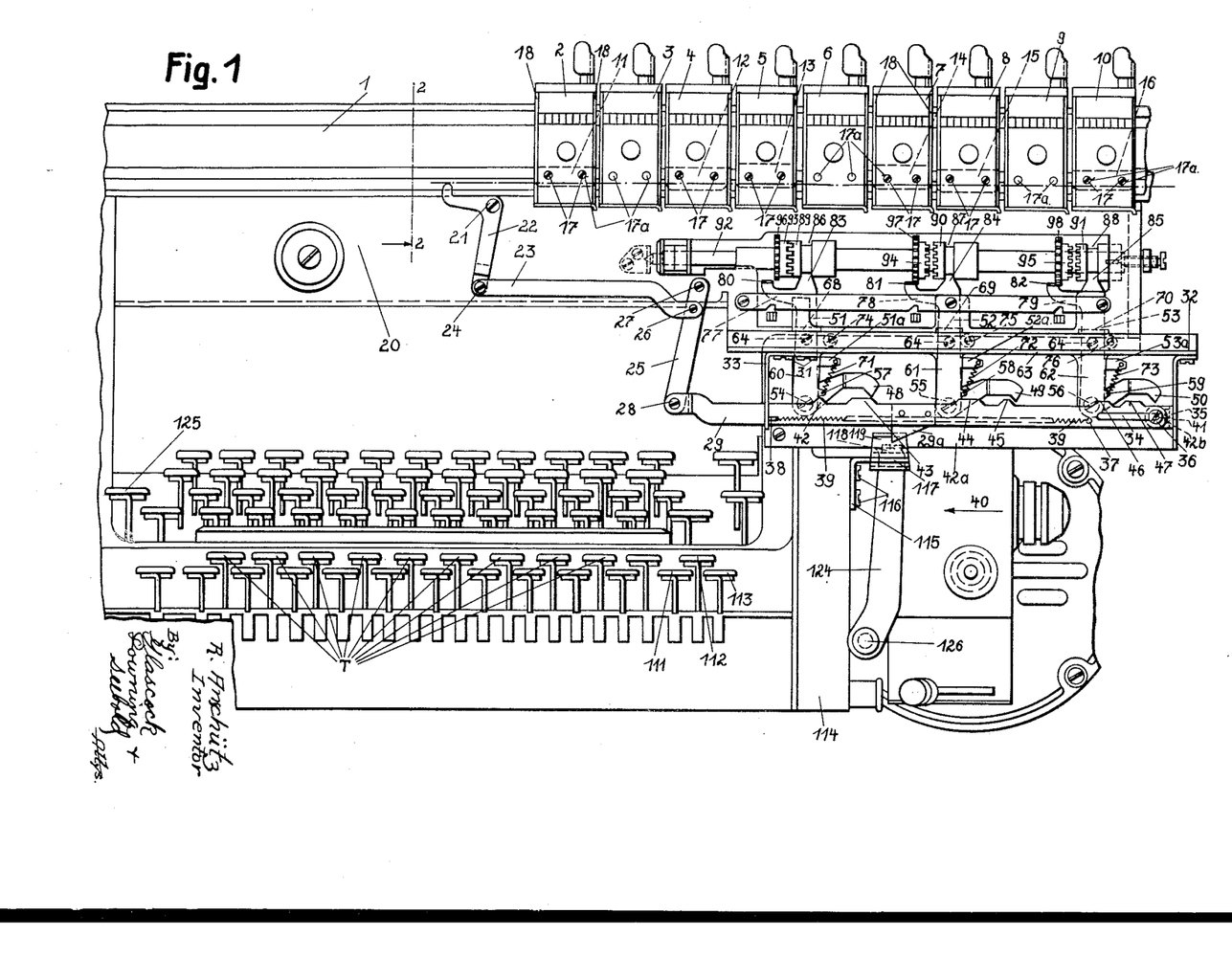
Fig. 1 is a front elevation of part of a typewriting calculating machine equipped with the device according to the invention, some parts being broken away, and other parts not directly cooperating with the device according to the invention, and the cross totalizers, being omitted to expose other parts.
Figure 2:
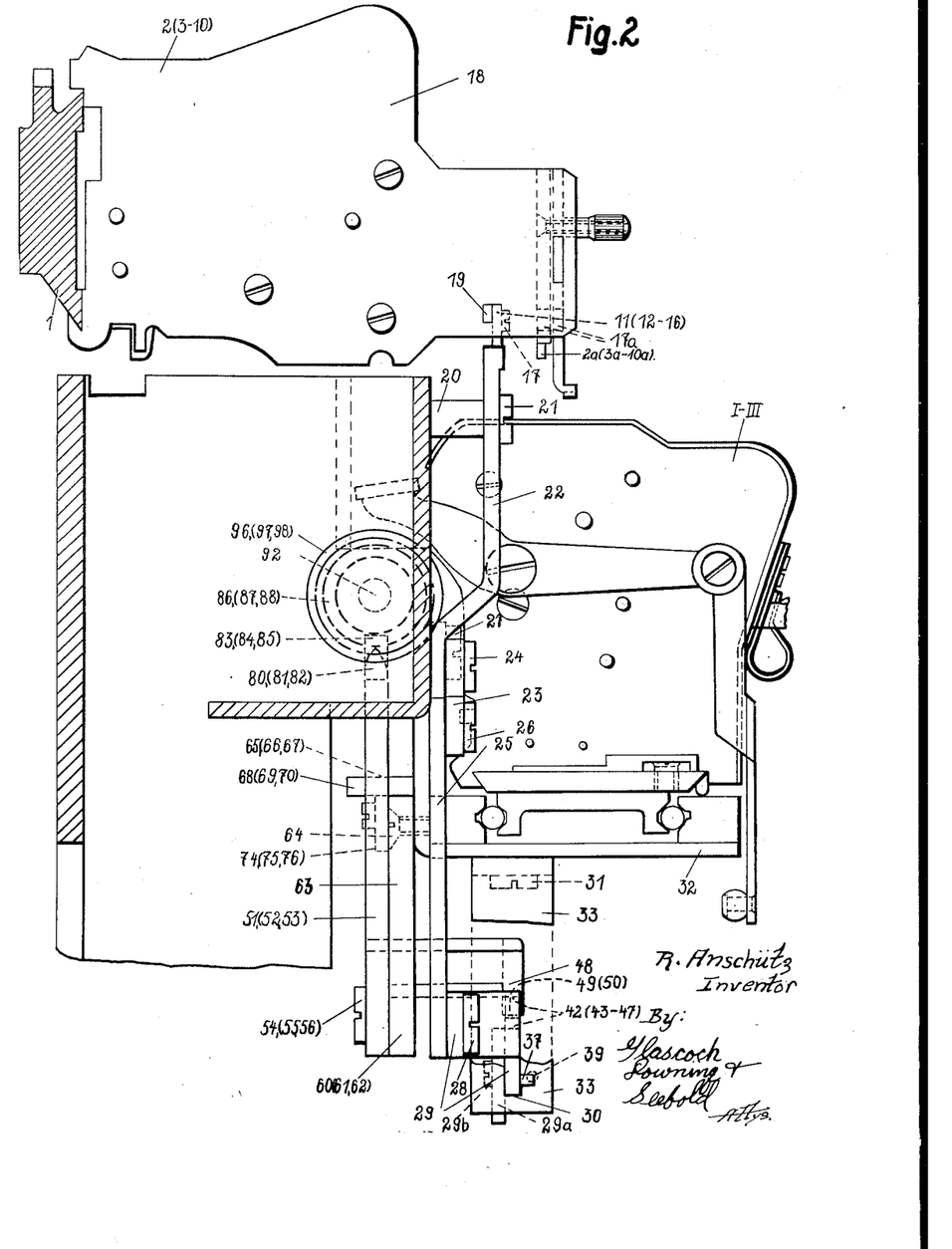
Fig. 2 is a vertical sectional view of the casing carrying the calculating mechanism, on line 2—2 in Fig. 1, viewed in the direction of the arrow, the column and cross totalizers being shown, but other parts, as said calculating mechanism, which are less important for the explanation, being omitted.

A totalizer suspension rail 1 secured to a well known paper carriage, not shown, supports, for instance, nine column totalizers 2 to 10, Fig. 1. The column totalizers 2, 4, 5, 7, 8, and 10 are equipped with controlling plates 11 to 16, respectively, which are exchangeable, and are secured to bars 19, Fig. 2, by screws 17. The bars 19 are held between the end plates 18 of the respective column totalizers, and the controlling plates 11 to 16 are arranged for cooperation with a selecting member 29 allotted to the three cross totalizers I, II, and III. Each column totalizer 2 to 10 supports an adjustable controlling plate 2a to 10a, Fig. 2, for cooperation with a well known change-over or state control gear—not shown—by which the species of calculation is determined. In order to permit of ready exchange of the adjustable controlling plates 11 to 16, holes 17a, Figs. 1 and 2, are made in the front plates of the column totalizers and in the controlling plates 2a to 10a whose inside diameter is substantially equal to the diameter of the heads of the screws 17, so that a screw driver can be introduced for unscrewing the screws 17.

When the controlling plates 11 to 16 move to the left (in Fig. 1), with the paper carriage, they engage the shorter arm of a feeler or bellcrank 22 mounted to swing about a headed screw 21 inserted in the front plate 20 of the casing for the calculating mechanism, and turn the feeler or bellcrank about its pivot 21 to a greater or lesser extent. A screw 24 at the free end of its longer arm connects the feeler to a pull rod 23 whose other end is pivotally connected to a link 25 at 26. The link 25 is mounted to swing about a headed screw 27 at its upper end, the screw being also inserted in the front plate 20 of the casing for the calculating mechanism. At its free lower end, the link 25 is pivotally connected to the controlling member 29 at 28.

Figure 3:
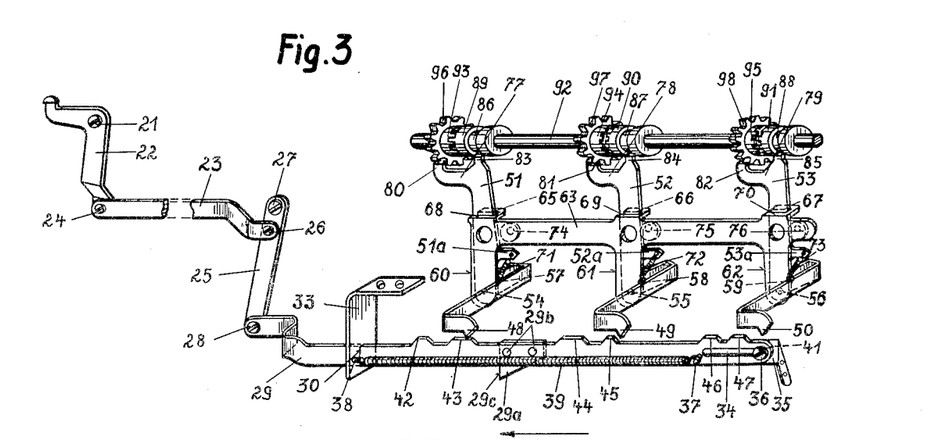
Fig. 3 is a perspective illustration of the parts belonging to the invention, in the position according to Fig. 1 and viewed from the right-hand side and the front of the machine.

The selecting member 29 which is constructed as a slide, is guided near its left-hand end in a slot 30 in the vertical arm of an angular bracket 33, Fig. 3. The horizontal arm of the bracket is secured to the lower side of a guiding table 32 for the cross totalizers I, II, and III by screws 31, Figs. 1 and 2. In its right-hand end, the cross totalizer selecting slide 29 has a longitudinal slot 34. A headed screw 36 is inserted in an angle bracket 35, Figs. 1 and 3, and extends through the slot 34. The angle bracket 35 is secured to a frame member 42a by screws 42b, Fig. 1, and the frame member 42a is attached to the casing of the calculating mechanism. The cross totalizer selecting slide 29 is additionally guided by the headed screw 36 and performs a straight-line motion under the control of the parts 23 and 25 when the feeler 22 is actuated. A rigid dog 29a, (Figs. 13, and 1 to 3), is secured to and depends from the rear side of the slide 29 at 29b, and the vertical leading edge 29c of the dog is arranged for cooperation with the outer end 120 of a horizontal double-armed carriage-return connecting lever 119, as will be described below. A spring 39 attached to a stud 37 on the selecting slide 29, and to a rivet 38 in the bracket 33, pulls the slide 29 to the left, as indicated by the arrow 40, until the end 41 of the slot 34 at the right bears against the shank of the screw 36, defining the normal position of the selecting slide 29 and the bellcrank 22.

Figure 4:
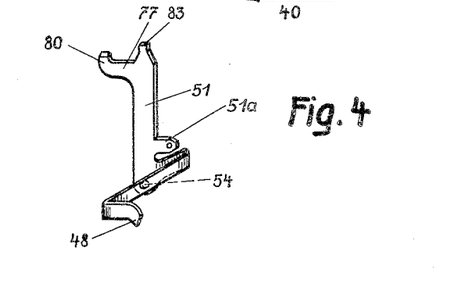
Fig. 4 is a perspective illustration of a detail of the invention, viewed from the right-hand side and the front of the machine.

The upper edge of the slide 29 presents three sets or pairs of spaced cams, 42, 43; 44, 45; and 46, 47. The sets cooperate, respectively, with noses 48, 49 and 50 at the lower ends of substantially L-shaped intermediate sensing links 51, 52, and 53, Figs. 3 and 4. The links are mounted to swing, respectively, about pivots 54, 55, and 56 at the lower ends of three spaced, depending lugs 60, 61 and 62 of a bearing bracket 63. Each lug is equipped, respectively, with a spring-suspension eye 57, 58, and 59. By means of screws 64 with counter-sunk heads, Figs. 1 and 2, the bracket 63 is secured to the rear side of the guiding table 32 for the cross totalizers I, II and III. Three guides 68, 69, and 70 extend at right angles to the rear from the upper edge of the bracket 63, Fig. 3, with slots 65, 66, and 67 which are open at the left. The intermediate sensing links 51, 52, and 53 which, as described, are mounted to swing about the pivots 54, 55, and 56 on the bracket 63, are guided in the respective slots 65, 66, and 67. Springs 71, 72, and 73 attached to lugs 51a, 52a, and 53a of the respective sensing links 51, 52, and 53 at one end, and to the corresponding eyes 57, 58, and 59 of the bracket 63 at the other end, tend to turn the links 51, 52, and 53 clockwise about their fulcrum screws 54, 55, and 56. This turning movement is limited, for the links 52 and 53, by eccentric abutments 75 and 76 at the rear side of the bracket 63 defining the normal positions of such links. The link 51 is held in its normal position by the cam 43 of the selecting slide 29 engaging below the nose 48 of the link 51 and holding the link in the corresponding position against the action of its spring 71. When the link 51 is not influenced by either cam 43 or 42 of the selecting slide 29, it rocks clockwise under the action of the spring 71 until arrested by an eccentric abutment 74 like said abutments 75 and 76 which defines the position of said link 51.

Driving or master wheels 96, 97, and 98 are mounted to turn on a main or master wheel driving shaft 92 and are operatively connected to the respective cross totalizers I, II, and III. The bosses or hubs 93, 94 and 95 of the respective or master wheels which are held undisplaceable on the main or master wheel driving shaft 92, are toothed at their ends, for cooperation with the correspondingly toothed ends of coupling sleeves 89, 90 and 91 splined on the master wheel shaft 92. Each sleeve has a groove 86, 87, and 88, respectively, on its perimeter in which engages the lug 83, 84, or 85 of the corresponding link 51, 52, or 53. Each link is equipped with a tooth 80, 81, or 82 at its upper end, and the tooth and the lug on each link are so positioned with respect to each other that the tooth engages in the corresponding driving or master wheel and locks it against rotation, when the lug has thrown the corresponding coupling sleeve 89, 90, 91 out of driving connection with the corresponding toothed hub 93, 94, 95 of the wheel 96, 97, 98 and vice versa.

In the initial position illustrated in Fig. 3, the driving or master wheel 96 for the cross totalizer I is coupled to the main driving shaft 92 by its sleeves 89 and the driving wheels 97 and 98 for the cross totalizers II and III are not coupled with the main driving shaft 92. At the same time, the tooth 80 which is at the end of the left-hand extension 77 on the link 51, has been moved clear of the driving wheel 96 and this is free to rotate with the main driving shaft 92. Similar left-hand extensions 78 and 79 on the links 52 and 53 engage the driving wheels 97 and 98 with their teeth 81 and 82, and hold the driving wheels—which are uncoupled from the main driving shaft 92—against rotation. As described, the lugs 83, 84, and 85 at the upper ends of the respective links 51, 52, and 53 engage in the annular grooves 86, 87, and 88 of the corresponding coupling sleeves 89, 90, and 91. Since the sleeves 89, 90 and 91 are splined on the main driving shaft 92, they can be shifted by the links 51, 52, and 53 engaging their annular grooves, but are held against rotation on the main driving shaft 92. Their teeth are arranged to cooperate with teeth on the hubs 93, 94, and 95 which are free to rotate about the master wheel shaft 92, but are held against displacement on the shaft. The driving wheels 96, 97, and 98 are seated on the hubs 93, 94 and 95 and by these means the driving wheels whose hubs have been connected with the respective sleeves 89, 90, and 91 by the corresponding links 51, 52 and 53, are positively rotated by the main driving shaft 92 and, at the same time, the teeth 80, 81 and 82 on the links 51, 52, and 53 are out of engagement of the driving or master wheels 96, 97 and 98.

An angular bracket 115 (Fig. 1), is secured, by screws 116, to a casing 114, (Fig. 1), which conceals certain parts of the reduction gearing by which the machine is driven by an electric motor, and which casing 114 is secured to one side of the machine. A headed screw 118 is inserted in the horizontal arm 117 of the bracket, Fig. 13, and the horizontal connecting lever 119 is mounted to swing about the screw 118. The edge 121 of the end 120 of its forwardly extending arm bears against the edge 29c of the dog 29a on the selecting slide 29. The rear end 122 of the lever 119 is forked to embrace a carriage return lever 124 fulcrumed at 126 for operation by the automatic carriage upon its return, or upon depression of the carriage return key 125. Rocking motion of the arm 124 is transmitted to the lever 119 which is operated as described in the following chapter headed: "The operation of the device according to the invention."

*The operation of the device according to the invention*

In the following, the operation of the device according to the invention will be described.

Figure 5:
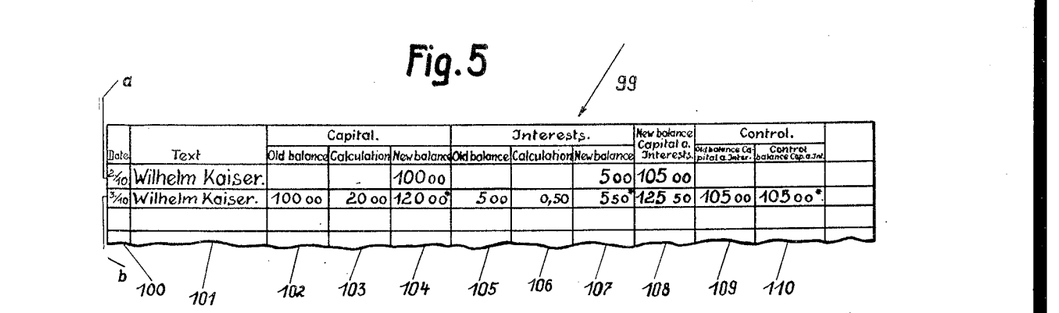
Fig. 5 shows a portion of a form in which entries are made as illustrated by way of example.

Assume that a booking operation is to be performed on the form 99 in Fig. 5. The entries in line a have been made on October 2. For performing another operation, the form 99 is inserted in the well known paper carriage, not shown, and placed in conformity with the corresponding totalizers. The date, October 3, is now written in line b, column 100, and the client's name "Wilhelm Kaiser" is typewritten in the column 101 by the letter typewriting keys of the machine. The paper carriage is moved to the left step by step. After the columns 100 and 101 have been filled in, the tabulator key T in Fig. 1 which corresponds to the value "100" is depressed. This moves the column 102 of the form 99 into writing position, and the column totalizer 2 and, through the known connection—shown in Fig. 1 of the Patent 2,046,524—the cross totalizers I, II and III are placed in calculating position. By operation of the corresponding calculating keys, the "new balance" 100 in line a, column 104, is carried forward to line b, column 102 to "old balance." When the carriage tabulated to the left, that is, while the column totalizer 2 was moved into calculating position, the controlling plate 11 of this column totalizer acted on the feeler or bellcrank 22 and turned this anti-clockwise about its fulcrum 21. The motion of the bellcrank 22 was transmitted to the controlling member or selecting slide 29 through the rod 23 and the link 25 to shift the selecting slide 29 in the direction opposite to the arrow 40, (Fig. 3), and the intermediate link 52 and the corresponding coupling sleeve 90 were slid axially into the positions shown in Fig. 7. In this position, the parts remain until the corresponding plate 11 of the column totalizer 2 releases the bellcrank 22. The edge 29c of the dog 29a secured on the selecting slide 29, Fig. 13 and 3, has receded from the edge 121 of the lever 119, but this is not important. As the selecting slide 29 is shifted, the cam 43 slides in contact with the nose 48 of the link 51 and this link is held in its normal position in which the teeth of the coupling sleeves 89 and 93 are in mesh to couple the driving wheel 96 for the totalizer I with the main driving shaft 92. The tooth 80 also remains in its normal position in which it is out of engagement with the master wheel 95 and the master wheel 96 is free to rotate with the main driving shaft 92. As the selecting slide 29 was shifted, the cam 45 on the selecting slide engaged the nose 49 of the link 52 and rocked it to the top of the cam. The link 52 is thereby turned anti-clockwise about its fulcrum 55 against the action of its spring 72, Fig. 3, and moves the teeth of the coupling sleeve 90 into mesh with the teeth of the coupling sleeve 94, and the driving wheel 97 for the cross totalizer II—which is in calculating position—is also coupled with the main driving shaft 92. During the motion of the link 52 the tooth 81 is moved out of engagement of the driving wheel 97, and this wheel also rotates with the shaft 92. The cam 47 on the selecting slide 29 has moved a little nearer to the nose 50 of the link 53 as the slide was moved but not into engagement with the tooth, and so the link 53 is not turned and the driving wheel 98 is not operated, as in this position of the link 53, the coupling sleeves 91 and 95 are not coupled. The tooth 82 is in engagement with the teeth of the driving wheel 98 and locks the wheel.

Consequently, when the column totalizer 2 is in calculating position, the controlling plate 11, through the parts referred to, couples the driving wheels 96 and 97 for the cross totalizers I and II with the main driving shaft 92, and the driving wheel 98 for the cross totalizer III is not so coupled. When the calculating keys are operated, as mentioned above, for introducing the value "100.00", this value "100.00" is introduced positively into the column totalizer 2 and the cross totalizers I and II. The corresponding position of the numeral wheels is indicated for 2, I, and II in Fig. 14. The value "100.00" is also written in the second line b of the form 99 in column 102. The paper carriage stops after the last place of the value "100.00" has been calculated and written. In this position the controlling plate 11 has moved beyond the bellcrank 22 which is now free, and the spring 39 returns the selecting slide 29, with the parts 25, 23, and 22 into the normal position illustrated in Fig. 6.

Figures 6, 7, 8, 9:
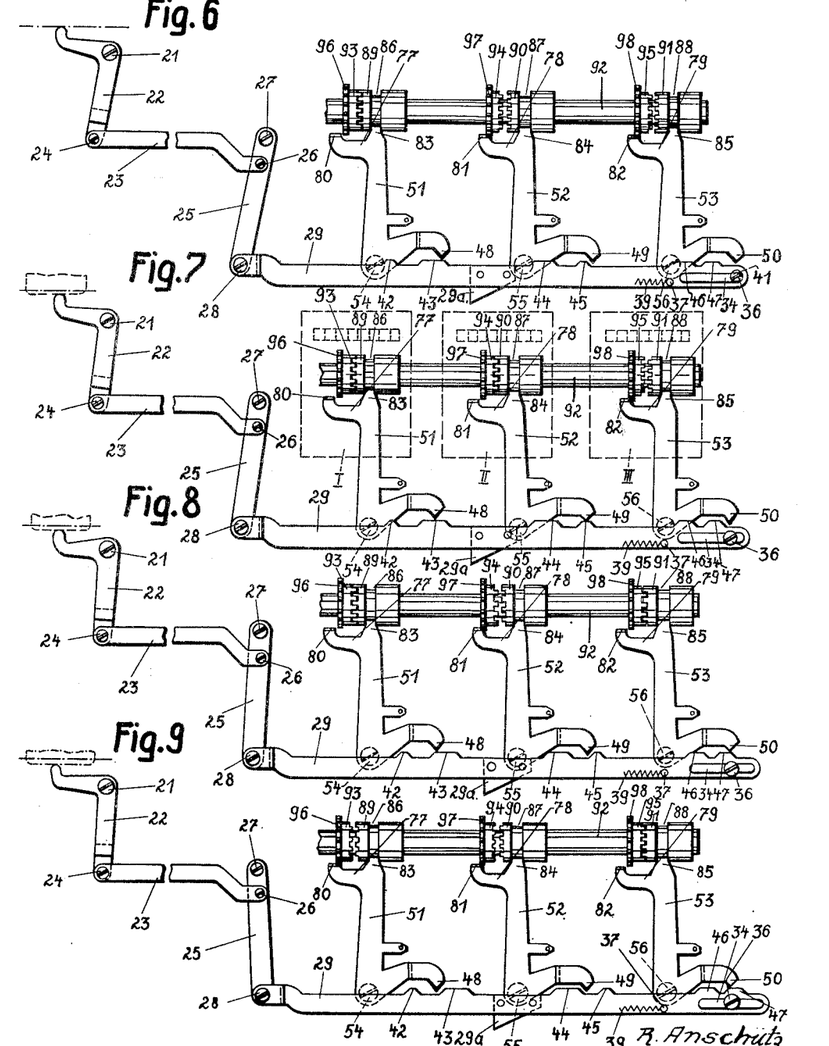
Fig. 6 shows the position in which the driving or master wheel of the cross totalizer I is coupled with the main driving shaft.
Fig. 7 shows the position in which the driving or master wheels of the cross totalizers I and II are coupled with the main or master wheel driving shaft.
Fig. 8 shows the position in which the driving or master wheels of the cross totalizers I and III are coupled with the main or master wheel driving shaft.
Fig. 9 shows the position in which the driving or master wheel of the cross totalizer III is coupled with the main or master wheel driving shaft.
Figures 13, 14, 15, 16:
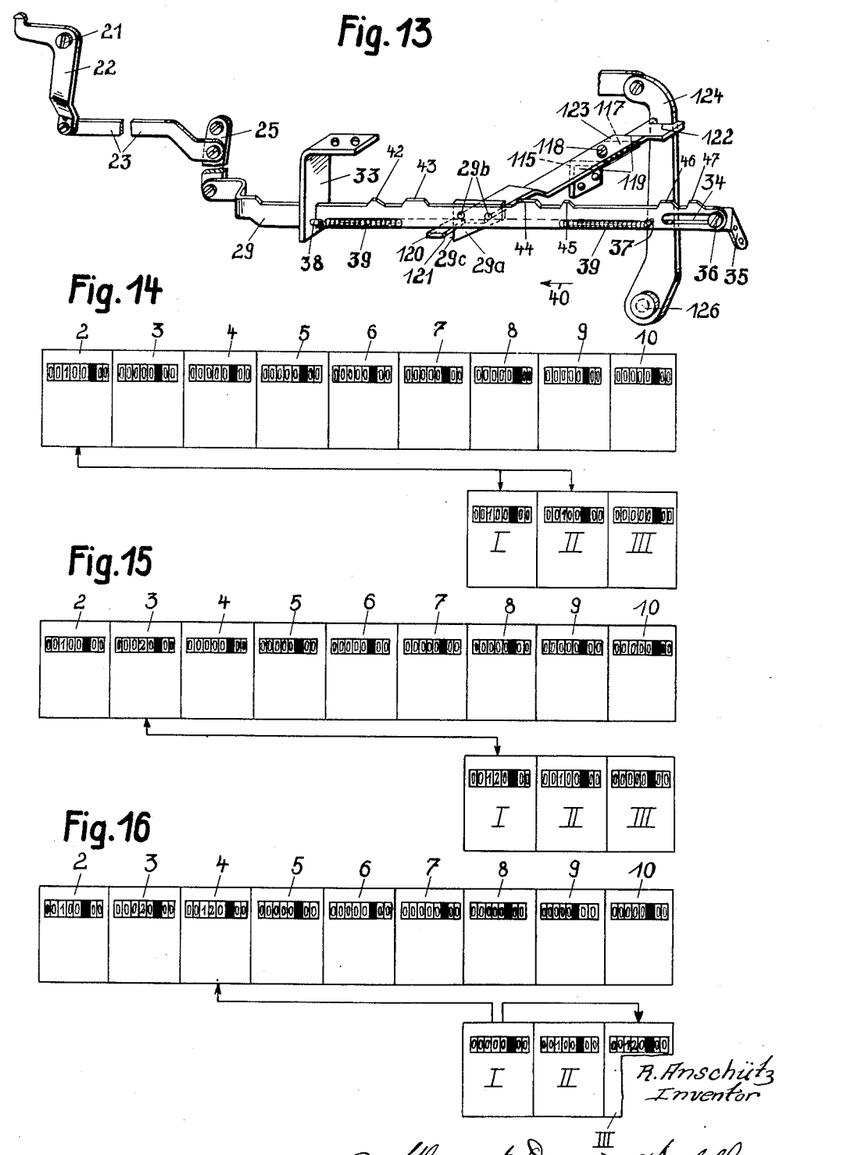
Fig. 13 is a perspective illustration showing certain parts of the device according to the invention, which are operated by the automatic carriage return.
Figs. 14 to 22 show diagrammatically the column and cross totalizers, the result being calculated at a given time being indicated on their numeral wheels, and the totalizers which cooperate at a given time, being marked.

When the last place of the value "100.00" has been calculated, the column totalizer 3 and, through the known connection shown in the Patent 2,046,524 in Fig. 1, the cross totalizers I, II, and III are moved into calculating position by depressing the tabulator key T which corresponds to the value "20.00", Fig. 1, and the column 103 of the form 99 is placed in writing position. The column totalizer 3 is without a controlling plate and when this totalizer moves to the left with the carriage, the bellcrank 22 and the slide 29 are not operated but remain in their normal positions, as shown in Fig. 6 and also in Figs. 1 and 3. In this position, the tooth 48 of the link 51 is still restrained by the cam 43 of the selecting slide 29 and the link 51 remains in the position into which it has been moved by being turned anti-clockwise about its fulcrum 54 against the spring 71, the coupling sleeves 89, 93 remain coupled and the tooth 80 of the link 51 remains out of engagement with the driving wheel 96, so that the driving wheel 96 is driven for operating the cross totalizer I. The links 52 and 53 have not been actuated by the corresponding cams on the selecting slide 29 so that their coupling sleeves 90, 94 and 91, 95 remain uncoupled and the driving wheels 97 and 98 for the cross totalizers II and III are not operated. When the calculating keys corresponding to the value "20.00" are depressed, this value "20.00" is introduced into the column totalizer 3 and into the cross totalizer I, as shown in Fig. 15, and written in the column 103 of the form 99, Fig. 5. Since the value "100.00" was already in the cross totalizer I, this totalizer, as appears from Fig. 15, now indicates "120.00".

By depressing the tabulator key T, Fig. 1, which corresponds to the value "120.00", the column totalizer 4 and the cross totalizers I, II and III are moved into calculating position and the column 104 of the form 99 is brought into writing position. The column totalizer 4 has a controlling plate 12 and this, through the bellcrank 22, moves the slide 29 into the position shown in Fig. 8 through parts 23 and 25. The cam 43 of the slide 29 is still below the tooth 48 of the link 51 so that the link remains in the position to which it has been turned anti-clockwise about its fulcrum 54, the corresponding coupling sleeves 89, 93 remain coupled and the driving wheel 96 for the cross totalizer I is driven, as before. In a similar manner, the link 53 in the position of the selecting slide 29 according to Fig. 8, is turned against its spring 73, Figs. 1 and 3 by the cam 47 on the slide 29 engaging below its tooth 50. The consequence is that the link 53, in turning anti-clockwise, couples the coupling sleeves 91 and 95 while at the same time the tooth 82 of the link 53 is out of engagement from the driving wheel 98 so that it is free to rotate and drive the cross totalizer III. The link 52 is idly operated and released in this position by the short cam 45 of the selecting slide 29 allotted to it. The corresponding coupling sleeves 90 and 94 engage, but are immediately disengaged due to the escape of the short cam 45 from beneath the nose 49 which enables the coupling disengaging spring 72 to function and the driving wheel 97 for the cross totalizer II is not operated.

When the column totalizer 4 is moved into calculating position, its adjustable controlling plate 4a, Fig. 2, shifts the axial reverse or state control gearing from additive to subtractive position, so that now the main driving shaft 92 and the driving wheels 96 and 98 which have been coupled therewith by the action of tappet 12 of column register 4 on the bellcrank 22, rotate in subtractive direction. The total taking key 111, Fig. 1, allotted to the cross totalizer I is now depressed whereby the positive value "120.00" appearing in the cross totalizer I is withdrawn negatively, that is, the cross totalizer I is set to zero, as shown in Fig. 16. At the same time, this value "120.00" is introduced additively into the cross totalizer III, since this is a negative cross totalizer wherein the sequels of numerals is reversed in direction from those on cross totalizers I and II. Similarly, the value is introduced into the column totalizer 4 additively, and written in the column 104 of the form 99. When the last figure of the value "120.00" has been written, the clear sign star is written also, as shown in Fig. 5, since the cross totalizer I has been set to zero.

By tabulation of the carriage, the column totalizer 5 and the cross totalizers I, II, and III are next brought into calculating position, and the column 105 of the form 99 located at the writing position. The controlling plate 13 of the column totalizer 5 turns the bellcrank 22 which, through the parts 23 and 25, shifts the selecting slide 29 into the position illustrated in Fig. 7. The cam 43 of the slide 29 remains below the tooth 48 of the link 51 and holds this link 51 in the position into which it has been turned. The coupling sleeves 89 and 93 remain coupled and the tooth 80 of the link 51 remains out of engagement from the driving wheel 96. The column totalizer I is driven by its wheel 96. A similar operation occurs with respect to the link 52 whose tooth 49 is on the top of the cam 45 on the slide 29 to hold this link 52 in the position into which it has been turned, coupling the engaging sleeves 90 and 94, and moving the tooth 81 on the link 52 out of engagement with the driving wheel 97 for the cross totalizer II which may be now driven. The link 53, however, is not operated by the cams 46, 47 on the slide 29, the coupling sleeves 91 and 95 remain uncoupled and the tooth 82 of this link 53 locks the driving wheel 98. Hence, this driving wheel 98 for the cross totalizer III is not rotated.

Figure 17:
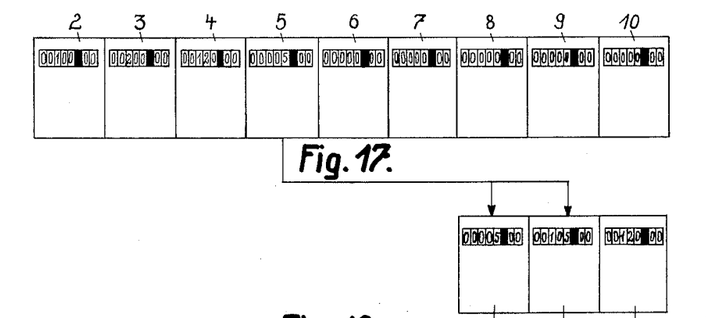

The controlling plate 5a, Fig. 2, of the column totalizer 5 for reversing the species of calculations of the cross totalizers is so adjusted that the main driving shaft 92 is rotated in additive direction by the known reverse or state control gear. The amount "5.00" which appears in the first line of the column 107 as the "new balance" is carried forward as the "old balance" on the second line in column 105 of the form 99 by depressing the corresponding calculating keys. The amount "5.00" is introduced at the same time into the cross totalizers I and II and into the column totalizer 5. Since the value "100.00" which has been introduced into the cross totalizer II by the first calculation, is already present in the cross totalizer, the value "105" now appears in the cross totalizer, as shown in Fig. 17.

Figure 18:
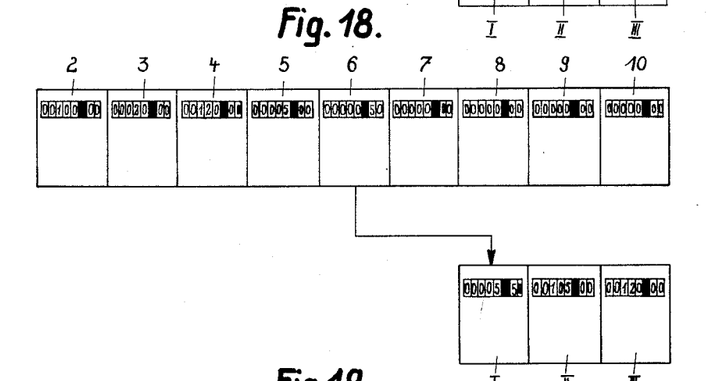
Figure 19:
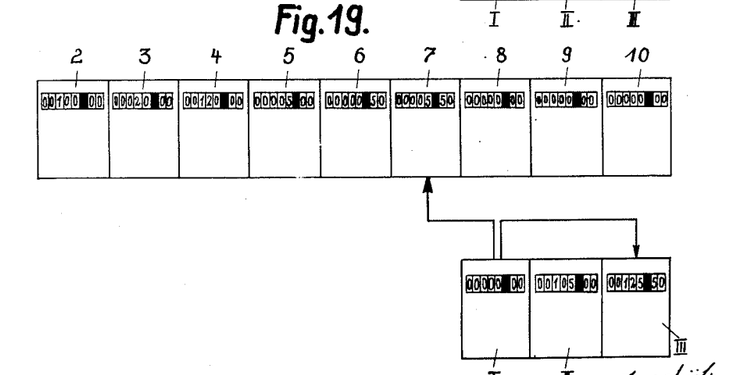

The column totalizer 6 and therewith the cross totalizers I, II, and III are now brought into calculating position, and column 106 of the form 99 is located at the writing position, by depressing the corresponding tabulator key. The column totalizer 6 has no controlling plate so that the bell-crank 22 is not operated and the slide 29 remains in the initial position illustrated in Figs. 1, 3 and 6 in which only the coupling sleeves 89 and 93 are coupled and the tooth 80 is out of engagement with the driving wheel 96. Only the driving wheel 96 is now rotated while the coupling sleeves 90, 94 and 91, 95 are uncoupled and their driving wheels 97, 98 are locked by the teeth 81 and 82 of the corresponding links 52 and 53. Hence, the driving wheels 97 and 98 for the cross totalizers II and III are not rotated. When the calculating keys for the value "0.50" are depressed, this value "0.50" is introduced into the column totalizer 6 and the cross totalizer I, and written down in the column 106 of the form 99. Since the value "5.00", is already present in the cross totalizer I, on account of the fourth calculation, the value "5.50" now appears in the cross totalizer I, as shown in Fig. 18.

By depressing the tabulator key which corresponds to the value "5.50", the column totalizer 7 and the cross totalizers I, II, and III are brought into calculating position, and column 107 of the form 99 is located at the writing position. The controlling plate 14 on the column totalizer 7 operates the bellcrank 22 which, through parts 23 and 25, shifts the selecting slide 29 into the position illustrated in Fig. 8 in which the teeth 48 and 50 of the links 51 and 53 are engaged by the coordinated cams 43, 47 on the slide 29, the coupling sleeves 89, 93 and 91, 95 are coupled and the teeth 80 and 82 are moved out of engagement with the driving wheels 96 and 98, so that these driving wheels, for the cross totalizers I and III, are rotated. When the selecting slide 29 performs its movement against the arrow 40, the link 52 is moved anti-clockwise for the short period during which the cam 45 on the slide 29 engages the tooth 49 of the link 52 but as soon as the tooth 49 of this link 52 is disengaged by the cam 45 of the slide 29, the link 52 again occupies the position illustrated in Fig. 8, the coupling sleeves 90 and 94 being uncoupled and the tooth 81 of the link 52 locking the driving wheel 97, so that this driving wheel 97, for the cross totalizer II, is not rotated. When the column totalizer 7 moves into calculating position, its controlling plate 7a reversing the species of calculations shifts the state control from addition to subtraction by the known reverse gear, and the main driving shaft 92 and the cooperating driving wheels 96 and 98 are rotated in subtractive direction. The total taking key 11, Fig. 1, for the cross totalizer I is again depressed, whereby the value "5.50" appearing in the cross totalizer I is withdrawn negatively, that is, the cross totalizer I is set to zero. At the same time, this value "5.50", since the cross totalizer III is negative, is introduced into this cross totalizer additively, and also into the column totalizer 7, as shown in Fig. 9, and written in the column 107 of the form 99. As the value "120" from the third calculation was already in the cross totalizer III, the value "125.50" is now registered in the cross totalizer II. When the last figure of the value "5.50" has been written in the column 107, the clear sign star is automatically printed behind the value, Fig. 5.

Figures 20, 21:
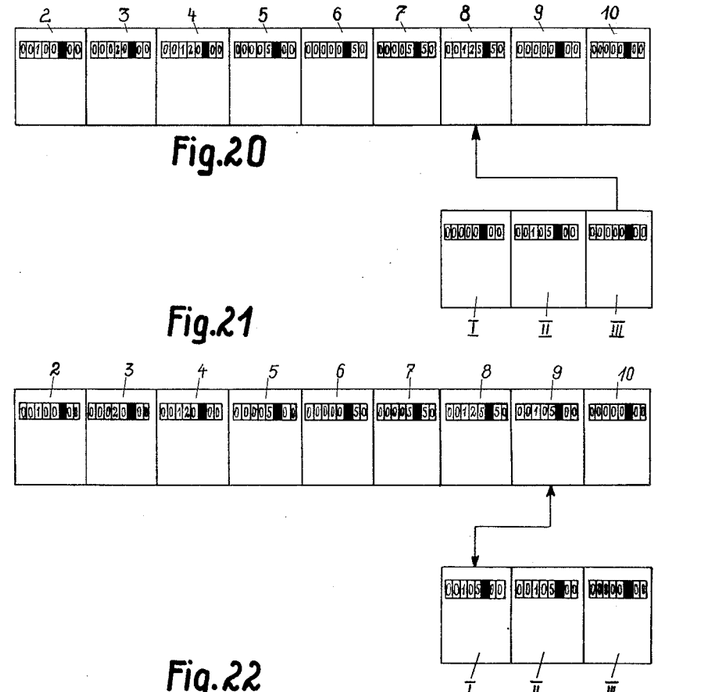

By depression of the proper tabulator key which corresponds to the value "125.50" the column totalizer 8 and the cross totalizers I, II, and II are brought to the calculating position, and the column 108 of the form 99 is located at the writing position. The controlling plate 15 of the column totalizer 8, through the bellcrank 22 and the parts 23 and 25, moves the selecting slide 29 into the position shown in Fig. 9. In this position, the link 53, through its tooth 50, is turned by the cam 47 of the slide 29 in anti-clockwise direction, and the tooth 82 of the link 53 moves out of engagement with the driving wheel 98. At the same time, the sleeves 91 and 95 are coupled and the driving wheel 98 for the cross totalizer III is driven. The links 51 and 52 are rocked during the shifting of the selecting slide 29 against the arrow 40, from the positions in Fig. 6 into those shown in Figs. 7 and 8 for a short period by the cams 43 and 45 of the slide 29 but then they return into the position of Fig. 9 as the cams 43 and 45 escape from beneath the teeth 48 and 49 of the links 51 and 52. In this position of the links 51 and 52, the coupling sleeves 89, 93 and 90, 94 are uncoupled and the teeth 80 and 81 of the links 51 and 52 lock the driving wheels 96 and 97, so that they cannot be rotated. The total taking key 112, Fig. 1, allotted to the cross totalizer III, is now depressed and the value "125.50" in the cross totalizer III is withdrawn from this totalizer in additive sense, that is, the cross totalizer III is set to zero. In this case the controlling plate 8a of the column totalizer 8 has not reversed the species of calculations so that the main driving shaft 92 is rotated in additive direction. This value "125.50" is introduced into the column totalizer 8, as shown in Fig. 20, and printed in column 108 of the form 99, Fig. 5.

Now, the tabulator key corresponding to the value "100" is depressed, the column totalizer 9 and the cross totalizers I, II, and III are brought into calculating position, and the column 109 of the form 99 is located at the writing position. The column totalizer 9 has no controlling plate and when it moves to the left with the carriage, the bellcrank 22 is not operated, and the selecting slide 29 remains in its normal position, as shown in Figs. 1, 3 and 6. In this position of the slide 29 the link 51 is held in the position to which it has been turned, by the cam 43 of the slide 29, the coupling sleeves 89 and 93 remain coupled and the driving wheel 96 for the cross totalizer I is driven while the links 52 and 53 are not rocked, and therefore, the coupling sleeves 90, 94 and 91, 95 remain uncoupled and the driving wheels 97, 98 for the cross totalizers II and III are not rotated. The amount "105.00" on the first line in column 108 of the form 99 which has been calculated from the "new balance" "100.00" of the capital and the new balance "5.00" of the interest of the first entry, is written in column 109 of the form 99 by depression of the corresponding calculating keys, and introduced into the cross totalizer I, for checking whether the value "105.00" which consists of the forewarding of the capital balance "100.00" and of the interest balance "5.00" of the second entry, is in conformity with the capital interest balance which has been read and introduced into the cross totalizer I, as shown in Fig. 21.

Figure 22:
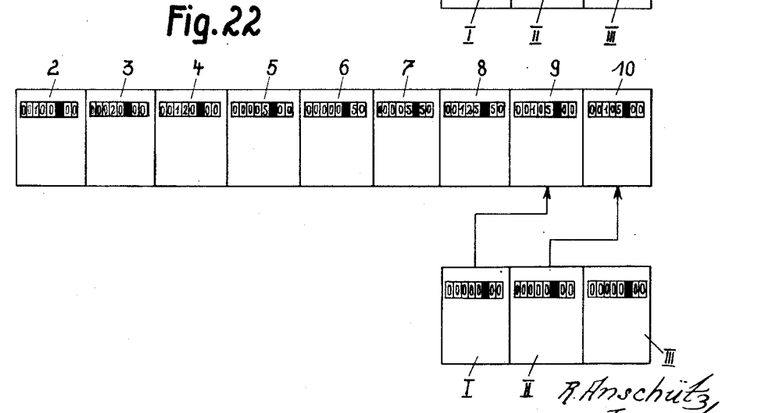

The tabulator key corresponding to the value "100.00" is now depressed and the column totalizer 10 and the cross totalizers I, II, and III are shifted into calculating positions, and the column 110 of the form 99 is brought to the writing position. The controlling plate 16 of the column totalizer 10, through the bellcrank 22 and parts 23 and 25, shifts the selecting slide 29 to the right to the position shown in Fig. 7. In this position, the links 51 and 52 are swung by the cams 43 and 45 of the slide 29, as described above, so that the coupling sleeves 89, 93 and 90, 94 are coupled and the driving wheels 96 and 97 for the cross totalizers I and II are driven, while the link 53 remains in its normal position. The coupling sleeves 91 and 95 remain uncoupled and so the driving wheel 98 for the cross totalizer III is not rotated. The cross-totalizer total-taking key 113 which is allotted to the cross totalizer II, is now depressed and the cross totalizers I and II are cleared, as shown in Fig. 22, that is, they are set to zero. The value withdrawn from the cross totalizer II is introduced into the column totalizer 10, and written in column 110 of the form 99. When the two cross totalizers I and II have been set to zero, the clear-sign mechanism is released, as described in Patent 2,046,524, and the clear sign star is placed behind the value "105.00" in column 110, as shown in Fig. 5. The operator now sees that he has properly carried forward the balance of the first booking operation, or calculated it correctly with the second booking operation.

When it is desired to perform a new calculation, the automatic carriage return (not shown) is released, or the carriage-return key 125 is depressed, for returning the paper carriage and with it the column totalizers 2 to 10, Fig. 1, into its initial position. The automatic carriage return means is of the type described and illustrated in prior Patent No. 2,046,524. By depressing the carriage-return key 125, Fig. 1, the carriage return clutch control arm 124, Figs. 1 and 13, is turned about its fulcrum 126 anti-clockwise. This movement is transmitted to the lever 119 whose forked end 122 engages the arm 124, and the lever 119 is swung about its fulcrum 118 in anti-clockwise direction also. The edge 121 of the arm 120 of the lever 119 acts on the edge 28c of the rigid dog 28a on the selecting slide 29, whereby the slide 29 is moved against the direction of the arrow 40 in Fig. 3, and against the action of the spring 39, until the carriage-return clutch has been thrown in and the arm 124 has completed its swinging motion. The left-hand end of the slot 34 in the slide 29 now bears against the screw 36. In this position of the slide 29, the bellcrank, or feeler, 22 has been turned anti-clockwise about the screw 21, and the parts 22, 23, 25, and 29 now occupy the position illustrated in Fig. 12.

After the carriage-return clutch has been thrown in the paper carriage moves to the right to its limit of right-hand travel, during which the controlling plates 11 to 16 of the column totalizers 2 to 10 clear the bellcrank 22 which is held in the position to which it has been turned, by the parts 119 and 124. When the paper carriage has arrived at its right-hand final position, as defined by the left-hand margin stop, the carriage return clutch control arm 124 is returned into its initial position, as shown in Figs. 1 and 13, the carriage return clutch is thrown out, and the carriage stops. The lever 119 partakes in this return of the arm 124 into its initial position according to Figs. 1 and 13, being turned clockwise about the screw 118. The consequence is that the selecting slide 29 returns into its initial position also, under the action of its spring 39, as shown in Figs. 1 and 13.

If, by inadvertence, the operator reads the new balance in the first line of column 104 of the capital of the booking operation which has been performed on October 2, that is "100.00" as "110.00", carries forward this value "110.00" instead of "100.00" as entered on October 3 in the second line of column 102, and carries the new balance "5.00" of the interest of the booking operation made on October 2 forward correctly in column 105, second line, for the operation to be performed on October 3, the value "115.00" would appear in the cross totalizer II at the end of the booking operation. The value "105.00" in line 1 of column 108, which was entered on the October 2, as a result of the addition of the correct new balance "100.00" of the capital and the new balance 5.00 of the interest, would then be read and introduced into the cross totalizer I for checking. The total-taking key 113 allotted to the cross totalizer II would be depressed and the total simultaneously taken from cross totalizers I and II which are driven together. When the erroneous value "115" has been written out of the cross totalizer II, that is, when its numeral wheels have been returned to zero, the total taking is completed. Since the cross totalizer I which is driven together with the cross totalizer II, registers only the value "105.00" but the erroneous value "115.00" is withdrawn, the capacity of the cross totalizer I is exceeded and it does not come to zero in consequence. As the cross totalizer I has not come to zero, the clear sign star is not printed and the operator discovers immediately that a mistake has occurred in the booking operation.

It may also occur that the operator carries forward incorrectly the amount "105.00" in the column 108, entered on October 2. For instance, he may read this as "110.00" and introduce this value into the column totalizer I. Then the value "110.00", by way of example, is in the cross totalizer I and the value "105.00" calculated by the entry on October 3 is in the cross totalizer II. By depressing the total taking key 113 allotted to the cross totalizer II, the cross totalizer is returned to zero, while the value "5.00" remains in the cross totalizer I, as, in conformity with the cross totalizer I, only the value "105.00" has been withdrawn, and the value "110.00" was in the cross totalizer II. The consequence is that the clear sign star is not printed, as the cross totalizer I has not come to zero, and the operator sees that a mistake has occurred in the booking.

Figure 10:
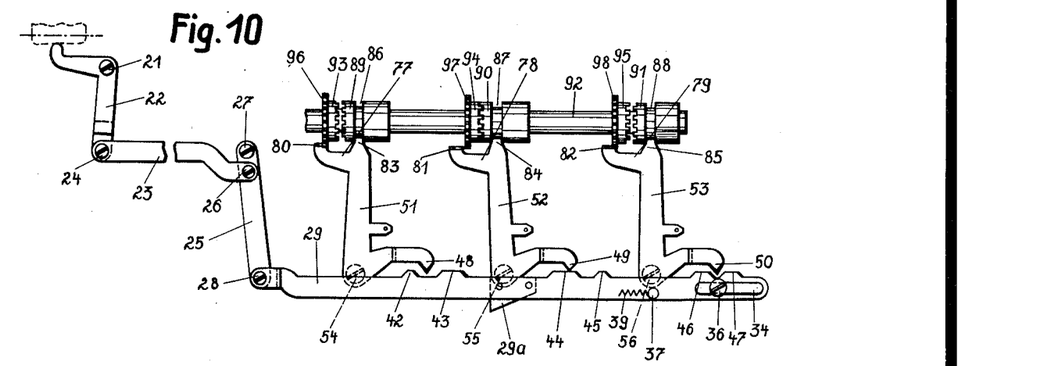
Fig. 10 shows the position in which the driving or master wheel of the cross totalizer II is coupled with the main or master wheel driving shaft.
Figure 11:
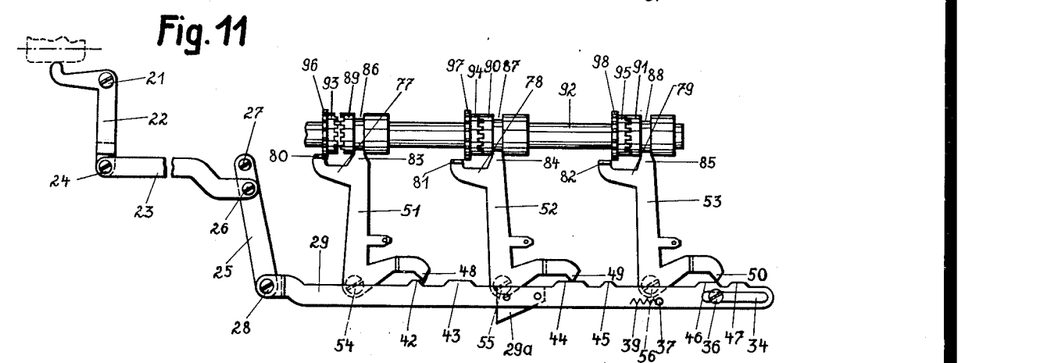
Fig. 11 shows the position in which the driving or master wheels of the cross totalizers II and III are coupled with the main or master wheel driving shaft.
Figure 12:
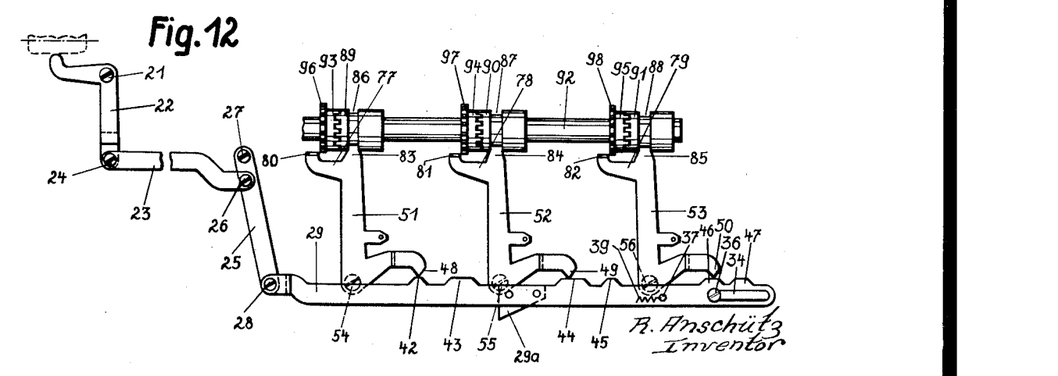
Fig. 12 shows the position in which the driving or master wheels of the cross totalizers I, II and III are all coupled to the main or master wheel driving shaft.

Although, as will be understood from the foregoing example, the controlling plates 11 to 16 of the column totalizers 2, 4, 6, 7, 8 and 10 provide for four coupling possibilities, through the control 22, 23, 25, 29, 51, 52, and 53, of the cross totalizers I, II and III, three more coupling possibilities of the driving wheels through corresponding controlling plates have been illustrated in Figs. 10 to 12.

The following table indicates all coupling possibilities of the driving wheels 96, 97 and 98 for the cross totalizers I, II, and III.

| Position | Cross totalizers driven | Illustrated in figure— |
|---|---|---|
| 1 | I | 6 |
| 2 | I and II | 7 |
| 3 | I and III | 8 |
| 4 | III | 9 |
| 5 | II | 10 |
| 6 | II and III | 11 |
| 7 | I, II, and III | 12 |

Having now particularly described and ascertained the nature of my said invention, and in what manner the same is to be performed, I declare that what I claim is:

In a combined typewriting-accounting machine, the combination with a travelling carriage; cross totalizers; a power-driven cross totalizer master wheel shaft; individual cross totalizer master wheels loosely mounted on the master wheel shaft; individual clutches for the respective cross totalizer master wheels to connect the master wheels to the shaft; individual clutch shifters to render the clutch effective and ineffective; a single rectilinearly shiftable cam bar to selectively control the respective clutch shifters; a feeler connected with the cam bar; tappets adjustably mounted on the carriage to actuate the feeler and the cam bar different extents depending upon the adjustment of the tappets; and a spring to advance the feeler into the paths of the tappets; of a carriage return mechanism to restore the carriage and its tappets to the beginning of a line; and a normally ineffective lever relatively to which the cam bar shifts in cross totalizer master wheel selecting operations, said normally ineffective lever interposed between the carriage return mechanism and the selecting cam bar, and operable by the carriage return mechanism to pick up the cam bar in any of the normal positions of the bar, and bodily shift the cam bar and its thereto connected feeler to their extreme limits of travel opposite that towards which the spring tends to urge the cam bar and feeler, to withdraw the feeler from the paths of the tappets, and retain the feeler in such withdrawn position during the carriage return.

ROBERT ANSCHÜTZ.